US009725525B2

(12) United States Patent
Takahashi et al.

(10) Patent No.: US 9,725,525 B2
(45) Date of Patent: *Aug. 8, 2017

(54) RUBBER COMPOSITION, MODIFIED POLYMER, AND TIRE

(71) Applicant: THE YOKOHAMA RUBBER CO., LTD., Minato-Ku, Tokyo (JP)

(72) Inventors: Ryota Takahashi, Hiratsuka (JP); Manabu Kato, Hiratsuka (JP); Takahiro Okamatsu, Hiratsuka (JP); Yoshiaki Kirino, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/115,099

(22) PCT Filed: Jun. 3, 2014

(86) PCT No.: PCT/JP2014/064761
§ 371 (c)(1),
(2) Date: Jul. 28, 2016

(87) PCT Pub. No.: WO2015/114845
PCT Pub. Date: Aug. 6, 2015

(65) Prior Publication Data
US 2017/0002101 A1    Jan. 5, 2017

(30) Foreign Application Priority Data
Jan. 31, 2014 (JP) .................. 2014-016762

(51) Int. Cl.
| | | |
|---|---|---|
| C08C 19/22 | (2006.01) | |
| C08K 5/32 | (2006.01) | |
| C08L 9/00 | (2006.01) | |
| B60C 1/00 | (2006.01) | |
| C08F 136/06 | (2006.01) | |
| C08F 136/08 | (2006.01) | |
| C08L 9/06 | (2006.01) | |
| C08F 36/04 | (2006.01) | |
| C08F 8/30 | (2006.01) | |

(52) U.S. Cl.
CPC .............. *C08C 19/22* (2013.01); *B60C 1/00* (2013.01); *B60C 1/0016* (2013.01); *B60C 1/0025* (2013.01); *C08F 8/30* (2013.01); *C08F 36/04* (2013.01); *C08F 136/06* (2013.01); *C08F 136/08* (2013.01); *C08L 9/06* (2013.01); *C08F 2500/21* (2013.01)

(58) Field of Classification Search
CPC ....... B60C 1/0016; B60C 1/0025; C08F 8/30; C08F 36/04; C08F 36/06; C08F 136/06; C08F 236/06; C08F 236/10; C08C 19/22; C08L 9/00; C08L 9/06; C08K 5/32
See application file for complete search history.

(56) References Cited

U.S. PATENT DOCUMENTS

| | | | | |
|---|---|---|---|---|
| 3,792,031 | A * | 2/1974 | Udding | C08C 19/22 525/333.1 |
| 9,493,599 | B2 * | 11/2016 | Takahashi | C08C 19/22 |
| 2007/0004869 | A1 * | 1/2007 | Parker | B60C 1/0016 525/331.9 |
| 2015/0322190 | A1 | 11/2015 | Takahashi et al. | |
| 2016/0340446 | A1 * | 11/2016 | Takahashi | C08C 19/22 |
| 2016/0340502 | A1 * | 11/2016 | Takahashi | C08L 9/06 |
| 2016/0347870 | A1 * | 12/2016 | Takahashi | B60C 1/0016 |
| 2016/0355057 | A1 * | 12/2016 | Kato | B60C 1/0016 |

FOREIGN PATENT DOCUMENTS

| | | |
|---|---|---|
| JP | 47-025712 B1 | 7/1972 |
| JP | 48-016996 A | 3/1973 |
| JP | 2013-032471 A | 2/2013 |
| JP | 2013-159717 A | 8/2013 |
| WO | 2014/077364 A1 | 5/2014 |

OTHER PUBLICATIONS

Dooley et al., "Synthesis of Neutral Spin-Delocalized Electron Acceptors for Multifunctional Materials", Organic Letters, American Chemical Society, 2007, vol. 9, No. 23, pp. 4781-4783.

* cited by examiner

*Primary Examiner* — Roberto Rabago
(74) *Attorney, Agent, or Firm* — Carrier Blackman & Associates, P.C.; Joseph P. Carrier; William D. Blackman

(57) ABSTRACT

An object of the present invention is to provide a modified polymer that can realize a rubber composition having excellent low heat build-up and that has excellent productivity, a rubber composition containing the modified polymer, and a tire produced using the rubber composition. The modified polymer of the present invention is obtained by reacting a modifier having a nitrone group and a carboxy group with a conjugated diene polymer not containing a tetrasubstituted olefin and/or a trisubstituted olefin.

20 Claims, 1 Drawing Sheet

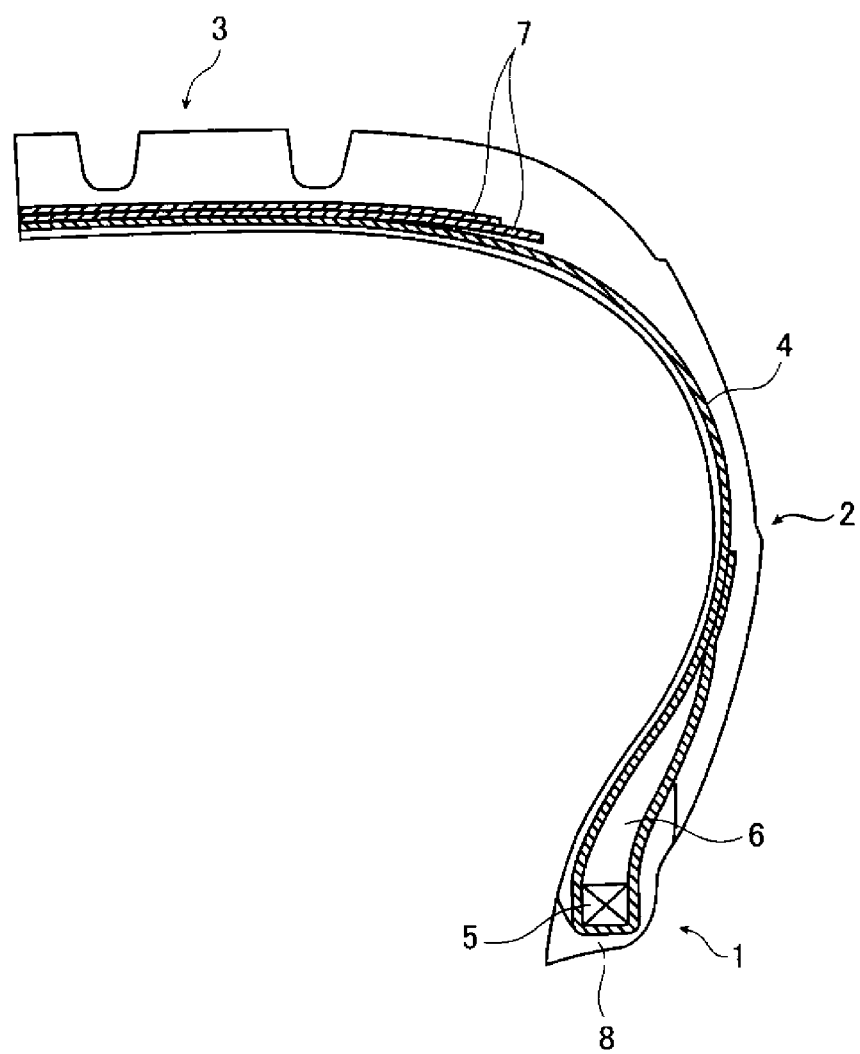

RUBBER COMPOSITION, MODIFIED POLYMER, AND TIRE

TECHNICAL FIELD

The present invention relates to a rubber composition, a modified polymer, and a tire.

BACKGROUND ART

There has been an increasing demand for improvements in the fuel consumption performance of pneumatic tires for the purpose of global environmental impact reduction in recent years. A known method of improving fuel consumption performance is to reduce the tire rolling resistance—that is, to reduce the heat build-up of the rubber composition that is used. With the objective of further reducing heat build-up while containing a butadiene rubber with a high cis structure, the present applicant has previously proposed a rubber composition containing a silica in an amount of from 10 to 120 parts by weight per 100 parts by weight of a diene-based rubber containing from 5 to 100 wt. % of a modified butadiene rubber, wherein the modified rubber is prepared by modifying a butadiene rubber having a cis content of not less than 90% with a nitrone compound having a nitrogen-containing heterocycle in the molecule (Patent Document 1).

CITATION LIST

Patent Literature

Patent Document 1: Japanese Unexamined Patent Application Publication No. 2013-32471A

SUMMARY OF INVENTION

Technical Problem

However, the present inventors discovered that there is room for improvement in the low heat build-up of a rubber composition containing a modified butadiene rubber produced using a nitrone compound having a nitrogen-containing heterocycle in the molecule as a modifier.

The present inventors also discovered that the reaction efficiency is low when a conjugated diene polymer such as natural rubber is modified using a compound having a nitrone group.

Therefore, an object of the present invention is to provide a modified polymer that can realize a rubber composition having excellent low heat build-up and that has excellent productivity, a rubber composition containing the modified polymer, and a tire produced using the rubber composition.

Solution to Problem

As a result of conducting dedicated research in order to solve the problems described above, the present inventors discovered that a modified polymer obtained by reacting a modifier having a nitrone group and a carboxy group with a conjugated diene polymer not containing a tetrasubstituted olefin and/or a trisubstituted olefin can realize a rubber composition having excellent low heat build-up, that a modified polymer can be obtained efficiently and with excellent productivity, and that a rubber composition and tire containing the modified polymer have low heat build-up, and the present inventors thereby completed the present invention.

Specifically, the inventors discovered that the problems described above can be solved by the following features.

(1) A rubber composition comprising a diene-based rubber and a modified polymer, the modified polymer being a modified polymer obtained by reacting a modifier having a nitrone group and a carboxy group with a conjugated diene polymer not containing a tetrasubstituted olefin and/or a trisubstituted olefin.

(2) The rubber composition according to (1) above, wherein the modifier is a nitrone represented by Formula (a) described below.

(3) The rubber composition according to (1) or (2) above, wherein the modifier is at least one type of a nitrone compound selected from the group consisting of N-phenyl-$\alpha$-(4-carboxyphenyl)nitrone, N-phenyl-$\alpha$-(3-carboxyphenyl)nitrone, N-phenyl-$\alpha$-(2-carboxyphenyl)nitrone, N-(4-carboxyphenyl)-$\alpha$-phenylnitrone, N-(3-carboxyphenyl)-$\alpha$-phenylnitrone, and N-(2-carboxyphenyl)-$\alpha$-phenylnitrone.

(4) The rubber composition according to any one of (1) to (3) above, wherein the conjugated diene polymer is at least one type selected from the group consisting of butadiene rubber, styrene-butadiene rubber, and nitrile rubber.

(5) The rubber composition according to any one of (1) to (4) above, wherein an amount of the modifier is from 0.01 to 2.0 mol % of double bonds of the conjugated diene polymer.

(6) The rubber composition according to any one of (1) to (5) above, wherein an amount of the modifier is more than 1 mass % with respect to the conjugated diene polymer.

(7) A tire comprising the rubber composition according to any one of (1) to (6) above.

(8) A modified polymer obtained by reacting a modifier having a nitrone group and a carboxy group with a conjugated diene polymer not containing a tetrasubstituted olefin and/or a trisubstituted olefin.

(9) The modified polymer according to (8) above, wherein the modifier is a nitrone represented by Formula (a) described below.

(10) The modified polymer according to (8) or (9) above, wherein the modifier is at least one type of a nitrone compound selected from the group consisting of N-phenyl-$\alpha$-(4-carboxyphenyl)nitrone, N-phenyl-$\alpha$-(3-carboxyphenyl)nitrone, N-phenyl-$\alpha$-(2-carboxyphenyl)nitrone, N-(4-carboxyphenyl)-$\alpha$-phenylnitrone, N-(3-carboxyphenyl)-$\alpha$-phenylnitrone, and N-(2-carboxyphenyl)-$\alpha$-phenylnitrone.

(11) The modified polymer according to any one of (8) to (10) above, wherein the conjugated diene polymer is at least one type selected from the group consisting of butadiene rubber, styrene-butadiene rubber, and nitrile rubber.

(12) The modified polymer according to any one of (8) to (11) above, wherein an amount of the modifier is from 0.01 to 2.0 mol % of double bonds of the conjugated diene polymer.

(13) The modified polymer according to any one of (8) to (12) above, wherein an amount of the modifier is more than 1 mass % with respect to the conjugated diene polymer.

Advantageous Effects of Invention

With the present invention, it is possible to provide a modified polymer that can realize a rubber composition having excellent low heat build-up and that has excellent productivity, and a rubber composition and a tire having excellent low heat build-up.

BRIEF DESCRIPTION OF DRAWINGS

FIG. 1 is a partial cross-sectional view schematically illustrating an example of an embodiment of the tire of the present invention.

DESCRIPTION OF EMBODIMENT

The present invention is described in detail below.

First, the modified polymer of the present invention is a modified polymer obtained by reacting a modifier having a nitrone group and a carboxy group with a conjugated diene polymer not containing a tetrasubstituted olefin and/or a trisubstituted olefin.

The modified polymer of the present invention has excellent low heat build-up since it is prepared by modifying a conjugated diene polymer not containing a tetrasubstituted olefin and/or a trisubstituted olefin with a modifier having a nitrone group and a carboxy group.

According to the present invention, the conjugated diene polymer serving as a raw material does not contain a tetrasubstituted olefin and/or a trisubstituted olefin, so the reaction efficiency with the modifier is high, which yields excellent productivity. In the present invention, the reason that the reaction efficiency of the modifier is high may be that the conjugated diene polymer does not contain a tetrasubstituted olefin and/or a trisubstituted olefin having high steric hindrance. In order to modify a conjugated diene polymer containing a tetrasubstituted olefin and/or a trisubstituted olefin (for example, natural rubber or isoprene rubber) with high efficiency using a modifier, it is necessary to react the polymer for a long period of time at a high temperature, and the present inventors discovered that in such cases, the rubber degrades and cannot be used in the rubber composition.

The conjugated diene polymer will be described hereinafter. The conjugated diene polymer used in the modified polymer of the present invention is not particularly limited as long as it is a polymer formed by a monomer fully or partially containing conjugated diene. However, in the present invention, the conjugated diene polymer does not contain a tetrasubstituted olefin and/or a trisubstituted olefin. That is, the conjugated diene polymer contains neither a tetrasubstituted olefin nor a trisubstituted olefin. A tetrasubstituted olefin refers to a carbon-carbon double bond having four substituents (—CX═CX—: X is a substituent). A trisubstituted olefin refers to a carbon-carbon double bond having three substituents (—CX═CX—: X is a substituent). The conjugated diene polymer has a double bond. Examples of the double bond include disubstituted olefins (—CH═CH—) and vinyl groups. The conjugated diene polymer may have a disubstituted olefin (—CH═CH—) in the main chain. The conjugated diene polymer may also have a double bond (same as described above) in the side chain.

In the present invention, the conjugated diene polymer may be a homopolymer or a copolymer.

The conjugated diene serving as a monomer is not particularly limited as long as it does not form a tetrasubstituted olefin or a trisubstituted olefin. An example is butadiene.

The monomer may contain other copolymerizable monomers other than conjugated diene. Examples include aromatic vinyl compounds such as styrene; ethylene, propylene, butene, and acrylonitrile.

When the monomer contains copolymerizable monomers other than conjugated diene, the amount of the conjugated diene (not forming a tetrasubstituted olefin or a trisubstituted olefin) is preferably from 26 to 70 mass % of the total amount of the monomers from the perspective of achieving excellent modifier reactivity.

The conjugated diene polymer is preferably at least one type selected from the group consisting of butadiene rubber (BR), styrene-butadiene rubber (SBR), and nitrile rubber (including NBR and partially hydrogenated products) from the perspective of achieving better low heat build-up and productivity and excellent economic efficiency.

The weight average molecular weight of the conjugated diene polymer is not particularly limited and may be, for example, from approximately $2\times10^5$ to $20\times10^5$. The weight average molecular weight (Mw) is measured by gel permeation chromatography (GPC) on the basis of standard polystyrene using tetrahydrofuran (THF) as a solvent (same hereafter).

There is no particular limitation on the production of the conjugated diene polymer. Examples thereof include conventionally known products. A single conjugated diene polymer may be used alone, or two or more types may be used in combination.

The modifier will be described hereinafter. The modifier used in the modified polymer of the present invention is not particularly limited as long as it is a compound having a nitrone group and a carboxy group. The nitrone group and the carboxy group can bond with a hydrocarbon group. The hydrocarbon group is not particularly limited. Examples of the hydrocarbon group include aliphatic hydrocarbon groups, alicyclic hydrocarbon groups, aromatic hydrocarbon groups, and combinations thereof. The hydrocarbon group may have a saturated bond. The hydrocarbon group is preferably an aromatic hydrocarbon group and more preferably a phenyl group, a naphthyl group, an anthryl group, a phenanthryl group, or a biphenyl group from the perspective of achieving excellent compatibility with the conjugated diene polymer. The hydrocarbon group may also have substituents other than the carboxy group.

A nitrone group is a group in which an oxygen atom bonds with a nitrogen atom of a Schiff base (—N$^+$(—O$^-$)═CH—). The number of nitrone groups of the modifier per molecule is preferably from 1 to 3 from the perspective of achieving better low heat build-up and productivity and excellent processability of the modified conjugated diene polymer.

The number of carboxy groups of the modifier per molecule may be 10 or smaller and is preferably 1 or 2 from the perspective of achieving better low heat build-up and productivity and enhancing solubility in a solvent when synthesizing the modifier so as to facilitate synthesis.

An example of a modifier is the compound represented by Formula (a2-1) below.

[Chemical Formula 1]

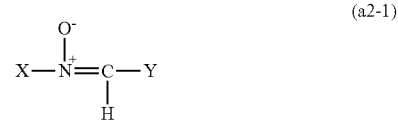

(a2-1)

In Formula (a2-1), X and Y are each independently a hydrocarbon group which may have a carboxy group, and the number of carboxy groups of the modifier per molecule is not less than 1. The hydrocarbon group is synonymous with that described above.

A specific example of a modifier is a nitrone represented by Formula (a) below.

[Chemical Formula 2]

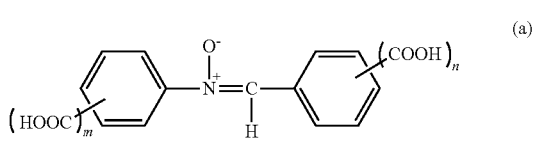

(a)

(In Formula (a), m and n each independently represent an integer of 0 to 5, and the sum of m and n is 1 or greater.)

The integer represented by m is preferably an integer of 0 to 2, and more preferably an integer of 0 or 1 in that the solubility in a solvent when synthesizing the modifier is enhanced so as to facilitate synthesis.

The integer represented by n is preferably an integer of 0 to 2, and more preferably an integer of 0 or 1 in that the solubility in a solvent when synthesizing the modifier is enhanced so as to facilitate synthesis.

Furthermore, the sum of m and n (m+n) is preferably from 1 to 4 and more preferably 1 or 2.

From the perspective of achieving high reactivity and excellent low heat build-up and productivity, the modifier is preferably at least one type of a nitrone compound selected from the group consisting of N-phenyl-α-(4-carboxyphenyl) nitrone represented by Formula (3-1) below, N-phenyl-α-(3-carboxyphenyl)nitrone represented by Formula (3-2) below, N-phenyl-α-(2-carboxyphenyl)nitrone represented by Formula (3-3) below, N-(4-carboxyphenyl)-α-phenylnitrone represented by Formula (3-4) below, N-(3-carboxyphenyl)-α-phenylnitrone represented by Formula (3-5) below, and N-(2-carboxyphenyl)-α-phenylnitrone represented by Formula (3-6) below.

[Chemical Formula 3]

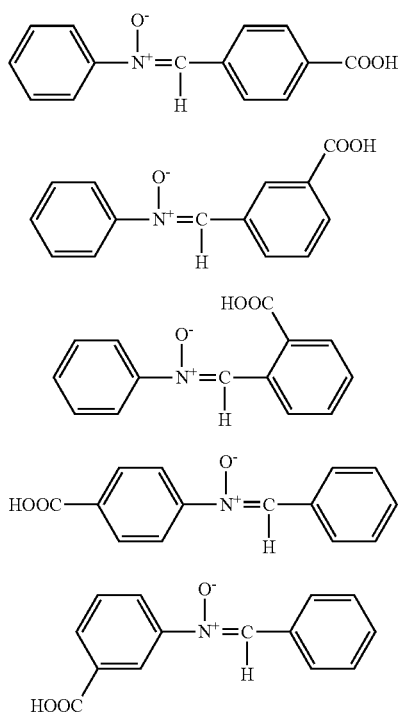

(3-1)
(3-2)
(3-3)
(3-4)
(3-5)

-continued

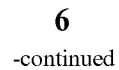

(3-6)

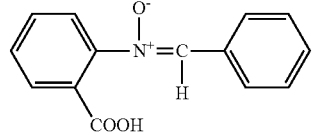

The method of producing the modifier used in the present invention is not particularly limited, and conventionally known methods can be used. An example is a method in which a compound having a hydroxyamino group (—NHOH) and a compound having an aldehyde group (—CHO) are stirred at a molar ratio of from 1.5:1 to 1:1.5 for 1 to 24 hours at room temperature in an organic solvent (for example, methanol, ethanol, tetrahydrofuran, or the like) so that both groups react with one another. In this reaction, the compound having a hydroxyamino group and/or the compound having an aldehyde group may have a carboxy group.

The method of producing the modified polymer of the present invention is not particularly limited, and conventionally known methods can be used. For example, the modified polymer of the present invention can be produced by mixing the conjugated diene polymer described above and the modifier described above for 1 to 30 minutes at 100 to 200° C.

At this time, as illustrated in Formula (1) below, a cycloaddition reaction may occur between unsaturated bonds of the conjugated diene polymer (for example, a 1,4-bond by conjugated diene) and the nitrone groups of the modifier so as to form a five-membered ring.

[Chemical Formula 4]

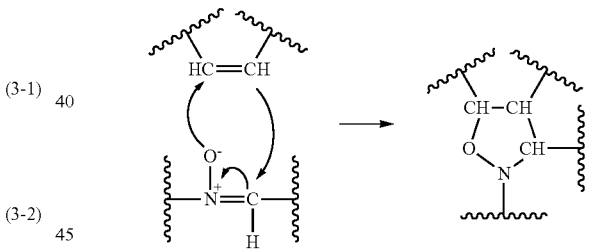

(1)

In addition, when the conjugated diene polymer has a vinyl group in the side chain (for example, a 1,2-bond by conjugated diene), a cycloaddition reaction may occur between the 1,2-bonds and the nitrone groups so as to form a five-membered ring.

[Chemical Formula 5]

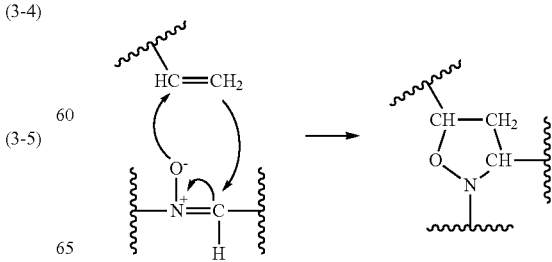

Formula (5)

The amount of the modifier used in the modified polymer of the present invention is preferably from 0.01 to 2.0 mol % and more preferably from 0.02 to 1.5 mol % of the double bonds of the conjugated diene polymer from the perspective of achieving low heat build-up, high reaction efficiency, better productivity, low viscosity, gelification resistance, and excellent processability.

The modified polymer of the present invention preferably assumes a form having a five-membered ring structure represented by Formula (A-1) below. In Formula (A-1), X and Y are synonymous with X and Y in Formula (a2-1) described above.

[Chemical Formula 6]

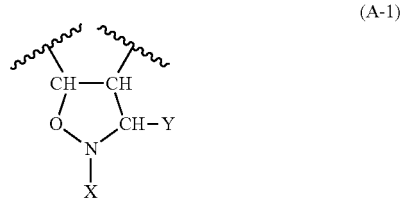

(A-1)

The modification ratio of the modified polymer of the present invention is not particularly limited. The modification ratio is preferably not less than 0.10 mol % of all of the double bonds of the conjugated diene polymer (for example, double bonds originated from conjugated diene polymer) and is more preferably not less than 0.20 mol % in that the reduction of heat build-up due to modification is more substantial. The upper limit of the modification ratio is not particularly limited but is preferably not more than 2.0 mol %.

The modification ratio represents the proportion (mol %) at which the structure of Formula (1) above and/or the structure of Formula (5) above is formed by modification by the modifier among all of the double bonds of the conjugated diene polymer. The modification ratio can be determined, for example, by performing NMR measurements on the conjugated diene polymer and the modified polymer (that is, the polymer before and after modification).

Next, the rubber composition of the present invention will be described hereinafter.

The rubber composition of the present invention is a rubber composition containing the modified polymer of the present invention.

The modified polymer contained in the rubber composition of the present invention is not particularly limited as long as it is the modified polymer of the present invention.

The rubber composition of the present invention may further contain at least one type selected from the group consisting of diene-based rubber other than a modified polymer (the modified polymer of the present invention), carbon black, silica, and silane coupling agents.

The diene-based rubber other than a modified polymer (modified polymer of the present invention) is not particularly limited as long as it is a vulcanizable rubber. An unmodified diene-based rubber and a modified polymer other than the modified polymer of the present invention are contained therein.

Examples of diene-based rubbers other than modified polymers include natural rubber (NR), isoprene rubber (IR), butadiene rubber (BR), 1,2-polybutadiene, chloroprene rubber, butyl rubber, styrene-butadiene rubber (SBR), nitrile rubber (acrylonitrile rubber and hydrogenated nitrile rubber), and ethylene propylene diene-based rubber. One type thereof may be used alone, or two or more types may be used in combination.

The weight average molecular weight of the diene-based rubber other than the modified polymer is not particularly limited and may be, for example, from approximately $2 \times 10^5$ to $20 \times 10^5$.

The mass ratio of the modified polymer and the diene-based rubber other than the modified polymer (modified polymer:diene-based rubber other than the modified polymer) is preferably from 10:90 to 100:0 from the perspective of achieving excellent low heat build-up, and is more preferably from 10:90 to 60:40 from the perspective of achieving excellent productivity.

Carbon black will be described hereinafter. The carbon black that can be further contained in the rubber composition of the present invention is not particularly limited. Examples thereof include conventionally known substances.

From the perspective of achieving excellent reinforcement action and dispersibility, the amount of the carbon black is preferably from 5 to 80 parts by mass, more preferably from 25 to 80 parts by mass, and even more preferably from 40 to 60 parts by mass per 100 parts by mass of the modified polymer or 100 parts by mass of the total of the modified polymer and diene-based rubber other than the modified polymer when the modified polymer and diene-based rubber other than the modified polymer are used in combination (when both are used in combination, this is called "100 parts by mass of the modified polymer and the like", same hereinafter).

Silica will be described hereinafter. The silica is not particularly limited, and a conventionally known silica that is blended into rubber compositions in applications such as tires can be used. Specific examples thereof include wet silica, dry silica, fumed silica, diatomaceous earth, and the like. One type thereof may be used alone, or two or more types may be used in combination.

The silica preferably has a cetyltrimethylammonium bromide (CTAB) adsorption specific surface area of from 100 to 300 $m^2/g$ and more preferably from 140 to 260 $m^2/g$ from the perspective of having excellent wet grip performance, abrasion resistance, and low heat build-up when formed into a tire.

Here, the CTAB adsorption specific surface area is an alternative characteristic of the surface area that can be utilized by silica for adsorption to the silane coupling agent and is a value determined by measuring the amount of CTAB adsorption to the silica surface in accordance with JIS K 6217-3:2001 "Part 3: How to Determine Specific Surface Area—CTAB Adsorption Method".

The amount of the silica is preferably from 20 to 120 parts by mass and more preferably from 25 to 95 parts by mass per 100 parts by mass of the modified polymer or 100 parts by mass of the modified polymer and the like from the perspective of achieving excellent wet grip performance, abrasion resistance, and low heat build-up when formed into a tire.

When the rubber composition of the present invention contains silica, one preferred mode is to further contain a silane coupling agent in order to enhance the dispersibility of the silica. The silane coupling agent is not particularly limited, and conventionally known substances may be used. Specific examples thereof include alkoxysilylpolysulfides such as bis(3-(triethoxysilylpropyl)tetrafulfide, bis(3-trimethoxysilylpropyl)tetrasulfide, and bis(3-triethoxysilylpropyl)disulfide; mercapto group-containing silane coupling agents such as mercaptopropyl trimethoxysilane and mercaptopropyl triethoxysilane; thiocarbamoyl polysulfides such as 3-trimethoxysilylpropyl-N,N-dimethylthiocarbamoyl-tetrasulfide and dimethoxymethylsilylpropyl-N,N-dimethylthiocarbamoyl-tetrasulfide; trimethoxysilylpropyl-mercaptobenzothiazole tetrasulfide, and triethoxysilylpropyl-methacrylate-monosulfide. One type thereof may be used alone, or two or more types may be used in combination.

An example of a preferred mode of a silane coupling agent is a mercapto-based silane coupling agent having a mercapto group and a hydrolyzable group.

Examples of the hydrolyzable group include alkoxy groups, phenoxy groups, carboxy groups, and alkenyloxy groups. Of these, alkoxy groups are preferable. When the hydrolyzable group is an alkoxy group, the number of carbon atoms of the alkoxy group is preferably from 1 to 16 and more preferably from 1 to 4. Examples of alkoxy groups having from 1 to 4 carbon atoms include methoxy groups, ethoxy groups, and propoxy groups.

Preferred modes of the mercapto-based silane coupling agent described above include a mercapto-based silane coupling agent having a polyether chain and/or a mercapto-based silane coupling agent having a polysiloxane structure (—Si—O—), and the like.

Here, a polyether chain is a group having two or more ether bonds, and a specific example thereof is a group represented by —$R^a$—(O—$R^b$)$_n$— (where n is 2 or greater). Here, in the structural unit described above, $R^a$ and $R^b$ each independently present a straight-chain or branched alkylene group, a straight-chain or branched alkenylene group, a straight-chain or branched alkynylene group, or a substituted or unsubstituted arylene group. Of these, straight-chain alkylene groups are preferable.

The amount of the silane coupling agent is preferably from 3 to 15 mass % and more preferably from 5 to 10 mass % of the amount of the silica from the perspective of achieving excellent silica dispersibility and excellent wet grip performance, abrasion resistance, and low heat build-up when formed into a tire.

The rubber composition of the present invention may further contain additives as necessary within a scope that does not inhibit the effect or purpose thereof. Examples of the additives include various additives that are typically used in rubber compositions for tires, such as carbon black, fillers other than silica, zinc oxide (zinc white), stearic acid, anti-aging agents, processing aids, various oils, liquid polymers, terpene resins, thermosetting resins, vulcanizing agents (for example, sulfur), and vulcanization accelerators. The content thereof is not particularly limited. The types and amounts of the additives may be selected as needed.

The method for producing the rubber composition of the present invention is not particularly limited, and specific examples thereof include a method whereby each of the above-mentioned components is kneaded using a publicly known method and device (e.g., a Banbury mixer, kneader, roller, or the like). When the rubber composition of the present invention contains sulfur or a vulcanization accelerator, it is preferable to mix the sulfur or vulcanization accelerator after first mixing components other than sulfur and the vulcanization accelerator (for example, mixing at 60 to 160° C.) and cooling the mixture.

In addition, the composition of the present invention can be vulcanized or crosslinked under conventional, publicly known vulcanizing or crosslinking conditions.

Next, the tire of the present invention will be described hereinafter.

The tire of the present invention is a tire produced using the rubber composition of the present invention.

The rubber composition used in the tire of the present invention is not particularly limited as long as it is the rubber composition of the present invention.

An example of the tire of the present invention is a pneumatic tire.

One preferable mode of the tire of the present invention is to form the tire tread portion and sidewall portion of the pneumatic tire with the rubber composition.

The tire of the present invention will be described hereinafter with reference to the attached drawings. The tire of the present invention is not limited to the attached drawings.

FIG. 1 is a partial cross-sectional view schematically illustrating an example of an embodiment of the tire of the present invention.

In FIG. 1, reference number 1 denotes a bead portion, reference number 2 denotes a sidewall portion, and reference number 3 denotes a tire tread portion. A carcass layer 4, in which a fiber cord is embedded, is mounted between a left-right pair of bead portions 1, and ends of the carcass layer 4 are wound by being folded around bead cores 5 and a bead filler 6 from an inner side to an outer side of the tire. In the tire tread portion 3, a belt layer 7 is provided on the outer side of the carcass layer 4. Rim cushions 8 are provided in parts of the bead portions 1 that are in contact with a rim (not illustrated).

The tire of the present invention can be produced, for example, in accordance with a conventionally known method. In addition to ordinary air or air with an adjusted oxygen partial pressure, inert gases such as nitrogen, argon, and helium can be used as the gas with which the tire is filled.

EXAMPLES

The present invention is described below in detail using working examples. However, the present invention is not limited to such working examples.

Production of Modifier

Terephthalaldehydic acid (30 g) represented by Formula (b) below and methanol (900 mL) serving as a solvent were placed in a reaction vessel, and a solution prepared by dissolving phenylhydroxylamine (21.8 g) represented by Formula (a) below in methanol (100 mL) was added thereto and reacted while stirring for 19 hours at room temperature. After the reaction ended, N-phenyl-α-(4carboxyphenyl)nitrone (mp: 243° C., molecular weight: 241) represented by Formula (c) below was obtained by recrystallization from methanol.

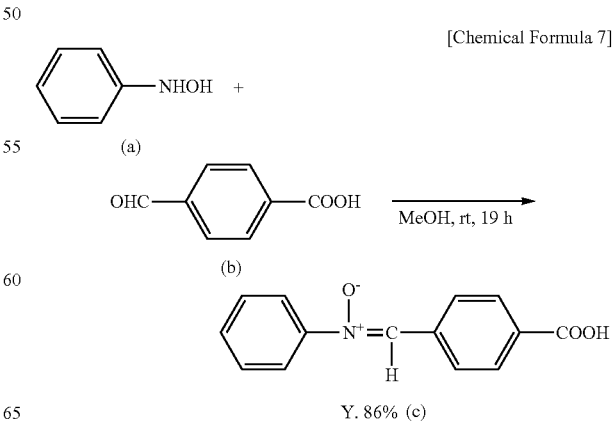

Production of Comparative Modifier (4-pyridyl-N-phenyl-nitrone)

First, 38.513 g (0.72 mol) of ammonium chloride was dissolved in a mixed solvent of 200 mL of water and 200 mL of ethanol, and 123.11 g (1 mol) of nitrobenzene was further added. Zinc was then slowly charged into a 1% hydrochloric acid aqueous solution and substituted 2 or 3 times with water. The zinc was slowly added while maintaining a cooled state in an ice bath. The solution was then stirred for 12 hours while continuing the ice bath. Next, after the zinc was filtered out, 107.1 g (1 mol) of p-pyridylaldehyde was slowly added to the filtrate in the ice bath and then stirred for 12 more hours. After the reaction ended, 4-pyridyl-N-phenylnitrone (light yellow powder substance) was obtained by distilling out the water and ethanol under reduced pressure and recrystallizing the solution from methanol.

Production of Modified Polymer

Using the components listed in the modified polymer production section of each table in the amounts shown in each working example, the components were mixed and reacted for 5 minutes at 160° C. with a sealed 1.7 liter Banbury mixer. In each table, modifier 1 [mol %] and comparative modifier [mol %] each refer to the mol % of the modifier 1 and the comparative modifier with respect to the double bonds of the conjugated diene polymer. In addition, modifier 1 [mass %] and comparative modifier [mass %] each refer to the mass % of the modifier 1 and the comparative modifier with respect to the conjugated diene polymer (the net amount when an oil extended product is used).

The modified polymer produced in Working Example 1 is expressed as modified BR 1. The modified polymers similarly produced in the other examples are also shown in each table. The amount of rubber in the tables is the net amount of each rubber.

Modification Ratio

The modification ratio was determined by performing an NMR measurement for the obtained modified polymer. Specifically, for examples in which modifiers produced as described above were used, the modification ratio was calculated by measuring the peak area in the vicinity of 8.08 ppm (belonging to two protons adjacent to the carboxy group) by means of a $^1$H-NMR measurement (CDCl$_3$, 400 MHz, TMS) using CDCl$_3$ as a solvent for the polymer before and after modification. For examples in which the comparative modifier produced as described above was used, the modification ratio was calculated in the same manner with the exception that the peak area originating from a pyridyl group was measured. In the $^1$H-NMR measurement of the modified polymer, after purification was repeated twice by dissolving a product after modification in toluene and precipitating the product in methanol, the product was dried under reduced pressure, and this sample was used for measurements. The results are shown in the tables.

Production of Unvulcanized Rubber Composition

Using the components listed in the rubber composition section of each table excluding sulfur and a vulcanization accelerator in the amounts shown in each working example, the components were mixed for 5 minutes at 160° C. with a sealed 1.7 liter Banbury mixer for 5 minutes. Sulfur and a vulcanization accelerator were then added thereto and mixed to produce a rubber composition. The amount of rubber in the tables is the net amount of each rubber.

Production of Vulcanized Rubber Sheet

The rubber composition produced as described above was vulcanized for 30 minutes at 150° C. in a mold with dimensions of 15 cm (vertical)×15 cm (horizontal)×0.2 cm (thickness) to produce a vulcanized rubber sheet.

Evaluation

The following evaluations were performed on the rubber compositions and vulcanized rubber sheets produced as described above. The results are shown in the tables. The evaluations other than the evaluation of processability are shown using the results of a standard example or Comparative Example 2 as an index of 100%. A standard example was used as a reference for Working Examples 1 to 8 and Comparative Example 1. Comparative Example 2 was used as a reference for Comparative Examples 3 and 4.

For the rubber composition of each example produced as described above, the Mooney viscosity (vis ML1+4 [M]) was measured in accordance with JIS K6300 using an L-type rotor (diameter: 38.1 mm, thickness: 5.5 mm) in a Mooney viscometer under the conditions of a preheating time of 1 minute, a rotor rotation time of 4 minutes, 100° C., and 2 rpm.

A lower value indicates lower viscosity and better processability of the unvulcanized rubber composition.

The processability was evaluated based on the Mooney viscosity described above. Cases in which the processability was excellent were evaluated as "A"; cases in which the processability was somewhat low were evaluated as "B"; and cases in which the modified polymer could not be processed due to degradation were evaluated as "C".

M300 (300% modulus), TB (breaking strength), and EB (breaking elongation): For the vulcanized rubber sheet of each example produced as described above, the 300% modulus, breaking strength, and breaking elongation were measured in accordance with JIS K6251: 2010 at temperature of 20° C. and a pulling speed of 500 mm/min after punching out a JIS No. 3 dumbbell-type test piece (thickness 2 mm).

A larger index indicates that the physical properties are superior.

tan δ (0° C.): For the vulcanized rubber sheet of each example produced as described above, the loss tangent at a temperature of 0° C., tan δ (0° C.), was measured using a viscoelastic spectrometer (manufactured by Toyo Seiki Seisaku-sho, Ltd.) under the following conditions: 10% initial distortion, ±2% amplitude, and 20 Hz frequency.

A larger index (that is, a larger value of tan δ (0° C.)) can be evaluated as indicating superior wet grip performance.

tan δ (60° C.): For the vulcanized rubber sheet of each example produced as described above, the loss tangent at a temperature of 60° C., tan δ (60° C.), was measured using a viscoelastic spectrometer (manufactured by Toyo Seiki Seisaku-sho, Ltd.) under the following conditions: 10% initial distortion, ±2% amplitude, and 20 Hz frequency.

A smaller index (that is, a smaller value of tan δ (60° C.)) can be evaluated as indicating superior low rolling resistance (superior low heat build-up).

TABLE 1

| | Standard Example | Working Example 1 | Working Example 2 | Working Example 3 | Working Example 4 | Working Example 5 | Working Example 6 | Comparative Example 1 |
|---|---|---|---|---|---|---|---|---|
| Production of modified polymer | | | | | | | | |
| Conjugated diene polymer | | BR1 | BR1 | BR1 | BR1 | BR1 | BR1 | BR1 |
| Modifier 1 [mol %] | | 0.02 | 0.1 | 0.2 | 1.0 | 2.0 | 3.0 | |
| Modifier 1 [mass %] | | 0.09 | 0.45 | 0.90 | 4.50 | 9.00 | 13.50 | |
| Comparative modifier [mol %] | | | | | | | | 0.8 |
| Comparative modifier [mass %] | | | | | | | | 2.96 |
| Produced modified polymer | | Modified BR1 | Modified BR2 | Modified BR3 | Modified BR4 | Modified BR5 | Modified BR6 | P-modified BR |
| Modification ratio [mol %] | | 0.0154 | 0.0516 | 0.1599 | 0.7824 | 1.876 | 2.3487 | 0.7532% |
| Rubber Composition | | | | | | | | |
| BR | 30.00 | | | | | | | |
| SBR | 70.00 | 70.00 | 70.00 | 70.00 | 70.00 | 70.00 | 70.00 | 70.00 |
| Types and amounts of modified BR used | | Modified BR1 30.00 | Modified BR2 30.00 | Modified BR3 30.00 | Modified BR4 30.00 | Modified BR5 30.00 | Modified BR6 30.00 | P-modified BR 30.00 |
| Silica | 70.00 | 70.00 | 70.00 | 70.00 | 70.00 | 70.00 | 70.00 | 70.00 |
| Carbon black | 5.00 | 5.00 | 5.00 | 5.00 | 5.00 | 5.00 | 5.00 | 5.00 |
| Zinc oxide | 3.00 | 3.00 | 3.00 | 3.00 | 3.00 | 3.00 | 3.00 | 3.00 |
| Stearic acid | 2.00 | 2.00 | 2.00 | 2.00 | 2.00 | 2.00 | 2.00 | 2.00 |
| Antiaging agent | 1.50 | 1.50 | 1.50 | 1.50 | 1.50 | 1.50 | 1.50 | 1.50 |
| Processing aid | 1.00 | 1.00 | 1.00 | 1.00 | 1.00 | 1.00 | 1.00 | 1.00 |
| Silane coupling agent | 5.60 | 5.60 | 5.60 | 5.60 | 5.60 | 5.60 | 5.60 | 5.60 |
| Process oil | 10.00 | 10.00 | 10.00 | 10.00 | 10.00 | 10.00 | 10.00 | 10.00 |
| Sulfur | 1.50 | 1.50 | 1.50 | 1.50 | 1.50 | 1.50 | 1.50 | 1.50 |
| Vulcanization accelerator 1 | 1.70 | 1.70 | 1.70 | 1.70 | 1.70 | 1.70 | 1.70 | 1.70 |
| Vulcanization accelerator 2 (DPG) | 2.00 | 2.00 | 2.00 | 2.00 | 2.00 | 2.00 | 2.00 | 2.00 |
| Vis ML1 + 4 [M] | 75.0 | 79.7 | 93.8 | 102.4 | 125.4 | 187.5 | 220.1 | 80.3 |
| Workability | A | A | A | A | A | A | B | A |
| M300 | 100% | 101% | 97% | 100% | 103% | 125% | 153% | 101% |
| TB | 100% | 99% | 100% | 94% | 95% | 85% | 60% | 99% |
| EB | 100% | 100% | 102% | 97% | 96% | 81% | 53% | 97% |
| Tan δ (0° C.) | 100% | 92% | 82% | 79% | 77% | 78% | 80% | 91% |
| Tan δ (60° C.) | 100% | 90% | 82% | 75% | 70% | 65% | 60% | 90% |

The details of each of the components shown in Table 1 are as follows.

Production of Modified Polymer
  Conjugated diene polymer BR1: Nipol BR 1220 manufactured by Zeon Corporation, weight average molecular weight: $5.0 \times 10^5$
  Modifier 1: produced as described above
  Comparative modifier: produced as described above
Rubber Composition
  BR: Nipol BR 1220, manufactured by Zeon Corporation, weight average molecular weight: $5.0 \times 10^5$
  SBR: TUFDENE E580, manufactured by Asahi Kasei Chemicals Corporation, weight average molecular weight: $13.6 \times 10^5$, amount of oil extension: 37.5 mass %
  Modified BR1-6, P-modified BR: produced as described above
  Silica: ZEOSIL 165 GR, manufactured by Rhodia Silica Korea Corporation
  Carbon black: Sho Black N339, manufactured by Cabot Japan K.K.
  Zinc white: zinc oxide, Zinc White No. 3, manufactured by Seido Chemical Industry Co., Ltd.
  Stearic acid: Beads Stearic Acid YR, manufactured by NOF Corp.
  Antiaging agent: SANTOFLEX 6PPD, manufactured by Soltia Europe
  Processing aid: Actiplast ST, manufactured by Rhein Chemie Corporation
  Silane coupling agent: Bis(3-triethoxysilylpropyl)tetrasulfide; Si69, manufactured by Evonik-Degussa
  Process oil: Extract No. 4S, manufactured by Showa Shell Sekiyu K.K.
  Sulfur: oil-treated sulfur, manufactured by Karuizawa Refinery Ltd.
  Vulcanization accelerator 1: Noccelar CZ-G, manufactured by Ouchi Shinko Chemical Industrial Co., Ltd.
  Vulcanization accelerator 2 (DPG): Soxinol D-G, manufactured by Sumitomo Chemical Co., Ltd.

TABLE 2

| | Standard Example | Working Example 7 | Working Example 8 | Comparative Example 2 | Comparative Example 3 | Comparative Example 4 |
|---|---|---|---|---|---|---|
| Production of modified polymer | | | | | | |
| Conjugated diene polymer | | SBR1 | SBR1 | | IR1 | IR1 |
| Modifier 1 [mol %] | | 0.3 | 2.0 | | 0.3 | 2.0 |

TABLE 2-continued

|  | Standard Example | Working Example 7 | Working Example 8 | Comparative Example 2 | Comparative Example 3 | Comparative Example 4 |
|---|---|---|---|---|---|---|
| Modifier 1 [mass %] |  | 0.86 | 5.75 |  | 1.05 | 7.00 |
| Produced modified polymer |  | Modified SBR1 | Modified SBR2 |  | Modified IR1 | Modified IR2 |
| Modification ratio [mol %] |  | 0.26 | 1.96 |  | 0.0083 | — |
| Rubber composition | | | | | | |
| BR | 30.00 | 30.00 | 30.00 |  |  |  |
| SBR | 70.00 | 40.00 | 40.00 | 70.00 | 70.00 | 70.00 |
| IR |  |  |  | 30.00 |  |  |
| Modified SBR1 |  | 30.00 |  |  |  |  |
| Modified SBR2 |  |  | 30.00 |  |  |  |
| Modified IR1 |  |  |  |  | 30.00 |  |
| Modified IR2 |  |  |  |  |  | 30.00 |
| Silica | 70.00 | 70.00 | 70.00 | 70.00 | 70.00 | 70.00 |
| Carbon black | 5.00 | 5.00 | 5.00 | 5.00 | 5.00 | 5.00 |
| Zinc oxide | 3.00 | 3.00 | 3.00 | 3.00 | 3.00 | 3.00 |
| Stearic acid | 2.00 | 2.00 | 2.00 | 2.00 | 2.00 | 2.00 |
| Antiaging agent | 1.50 | 1.50 | 1.50 | 1.50 | 1.50 | 1.50 |
| Processing aid | 1.00 | 1.00 | 1.00 | 1.00 | 1.00 | 1.00 |
| Silane coupling agent | 5.60 | 5.60 | 5.60 | 5.60 | 5.60 | 5.60 |
| Process oil | 10.00 | 10.00 | 10.00 | 10.00 | 10.00 | 10.00 |
| Sulfur | 1.50 | 1.50 | 1.50 | 1.50 | 1.50 | 1.50 |
| Vulcanization accelerator 1 | 1.70 | 1.70 | 1.70 | 1.70 | 1.70 | 1.70 |
| Vulcanization accelerator 2 (DPG) | 2.00 | 2.00 | 2.00 | 2.00 | 2.00 | 2.00 |
| Vis ML1 + 4 [M] | 75.0 | 81.6 | 150.3 | 87.2 | 86.4 | 50.3 |
| Workability | A | A | A | A | A | C |
| M300 | 100% | 109% | 110% | 100% | 102% | 63% |
| TB | 100% | 109% | 107% | 100% | 97% | 85% |
| EB | 100% | 105% | 109% | 100% | 96% | 70% |
| Tan δ(0° C.) | 100% | 97% | 89% | 100% | 98% | 97% |
| Tan δ(60° C.) | 100% | 84% | 69% | 100% | 98% | 96% |

The details of each of the components shown in Table 2 are as follows.

Production of Modified Polymer

Conjugated diene polymer SBR1: TUFDENE E580 manufactured by Asahi Kasei Chemicals Corporation, weight average molecular weight: $13.6 \times 10^5$, amount of oil extension: 37.5 mass %, styrene content: 37 mass %

Conjugated diene polymer IR1: Nipol IR 2200 manufactured by Zeon Corporation, weight average molecular weight: $3.9 \times 10^5$ Modifier 1: same as in Table 1

Rubber Composition

BR: Nipol BR 1220 manufactured by Zeon Corporation, weight average molecular weight: $5.0 \times 10^5$ SBR: TUFDENE E580 manufactured by Asahi Kasei Chemicals Corporation, weight average molecular weight: $13.6 \times 10^5$, amount of oil extension: 37.5 mass %

BR: Nipol IR 2200 manufactured by Zeon Corporation, weight average molecular weight: $3.9 \times 10^5$ Modified SBR1-2: same as in Table 1

Modified IR1-2: produced as described above

Each component from silica to vulcanization accelerator 2 (DPG): same as in Table 1

As is clear from the results shown in Tables 1 and 2, the rubber compositions containing modified polymers modified by modifiers having nitrone groups and carboxy groups (Working Examples 1 to 6; Working Examples 7 and 8) exhibited excellent low heat build-up in comparison to the standard example shown in Table 1 (the standard example of Table 2 is the same as in Table 1).

In addition, it was determined that tan δ (60° C.) decreases as the modification ratio of the modified polymer increases, which yields better low heat build-up and higher rubber stress. This may be due to the fact that the agglomeration of the filler was inhibited by the interaction between the filler (for example, carbon black and/or silica) and the carboxy groups introduced by modification.

It was also determined that the viscosity of the compound increased as the modification ratio of the modified polymer increased. This may be due to the fact that a pseudo crosslinking moiety was formed by the interaction between the filler (for example, carbon black and/or silica) and the carboxy groups introduced by modification.

In a comparison of tan δ between Working Example 4 and Comparative Example 1 (modification by the comparative modifier) in Table 1, it can be seen that Working Example 4 exhibits a lower tan δ (60° C.) index and better low heat build-up than Comparative Example 1.

In a comparison of tan δ (60° C.) between Comparative Example 2 and Comparative Examples 3 and 4, it can be seen that there is no difference between the tan δ (60° C.) indices of Comparative Examples 3 and 4 and that of Comparative Example 2, and that the low heat build-up cannot be enhanced. In addition, the IR serving as a raw material in Comparative Example 4 degraded after modification, so it was not possible to measure the modification ratio thereof.

Working Examples 1 to 8 exhibited a low viscosity and excellent processability of the unvulcanized rubber composition.

Experiment on the Reactivity of the Conjugated Diene Polymer with respect to the Modifier Modifier 1 produced as described above was used with respect to SBR1 serving as a conjugated diene polymer (same as SBR1 in Table 2 described above) in an amount of 2 mol % of the double bonds of SBR1, and these were mixed and reacted at 180° C. to produce a modified polymer (modified SBR).

In addition, modified polymers (modified BR and modified IR) were produced in the same manner as in the reaction of SBR1 with the exception that the conjugated diene polymer was replaced with BR1 (same as BR1 in Table 1 described above) and IR1 (same as IR1 in Table 2 described above).

The modification ratio of each modified polymer was calculated in the same manner as described above.

As a result, although SBR1 and BR1 completed the respective reactions with the modifier after 15 minutes of the reaction, IR1 did not complete the reaction even after 30 minutes. This may be due to the steric hindrance of methyl groups substituted in the double bonds of the IR.

This suggested that a conjugated diene polymer not containing a tetrasubstituted olefin and/or a trisubstituted olefin reacts efficiently with a modifier (nitrone).

In addition, the polymer degraded in the IR system 30 minutes after the reaction was begun, and it was not possible to use the polymer in a rubber composition. The other modified polymers exhibited excellent processability without any degradation or gelification.

REFERENCE SIGNS LIST

1 Bead portion
2 Sidewall portion
3 Tire tread portion
4 Carcass layer
5 Bead core
6 Bead filler
7 Belt layer
8 Rim cushion

The invention claimed is:

1. A rubber composition comprising a diene-based rubber and a modified polymer, the modified polymer being a modified polymer obtained by reacting a modifier having a nitrone group and a carboxy group with a conjugated diene polymer not containing a tetrasubstituted olefin and/or a trisubstituted olefin, and the modified polymer having a five-membered ring structure which is formed by a cycloaddition reaction between an unsaturated bond of the conjugated diene polymer and the nitrone group of the modifier and is represented by one of Formula (1) or (2)

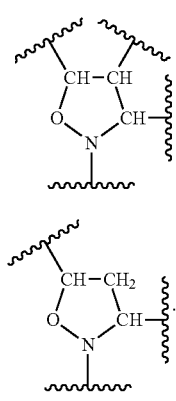

2. The rubber composition according to claim 1, wherein the modifier is a nitrone represented by Formula (a):

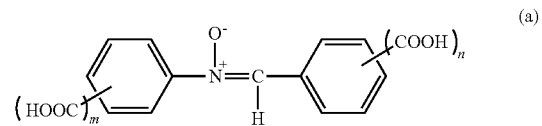

wherein, m and n each independently represent an integer of 0 to 5, and a sum of m and n is 1 or greater.

3. The rubber composition according to claim 1, wherein the modifier is at least one type of a nitrone compound selected from the group consisting of N-phenyl-α-(4-carboxyphenyl)nitrone, N-phenyl-α-(3-carboxyphenyl)nitrone, N-phenyl-α-(2-carboxyphenyl)nitrone, N-(4-carboxyphenyl)-α-phenylnitrone, N-(3-carboxyphenyl)-α-phenylnitrone, and N-(2-carboxyphenyl)-α-phenylnitrone.

4. The rubber composition according to claim 1, wherein the conjugated diene polymer is at least one type selected from the group consisting of butadiene rubber, styrene-butadiene rubber, and nitrile rubber.

5. The rubber composition according to claim 1, wherein an amount of the modifier is from 0.01 to 2.0 mol % of double bonds of the conjugated diene polymer.

6. The rubber composition according to claim 1, wherein an amount of the modifier is more than 1 mass % with respect to the conjugated diene polymer.

7. A tire comprising the rubber composition described in claim 1.

8. A modified polymer obtained by reacting a modifier having a nitrone group and a carboxy group with a conjugated diene polymer not containing a tetrasubstituted olefin and/or a trisubstituted olefin, the modified polymer having a five-membered ring structure which is formed by a cycloaddition reaction between an unsaturated bond of the conjugated diene polymer and the nitrone group of the modifier and is represented by one of Formula (1) or (2)

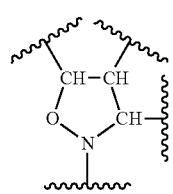

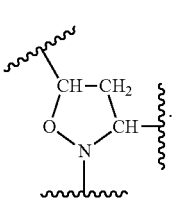

9. The modified polymer according to claim 8, wherein the modifier is a nitrone represented by Formula (a):

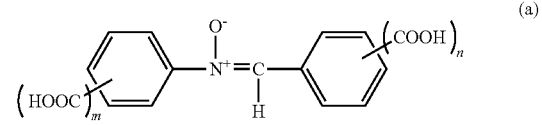

wherein, m and n each independently represent an integer of 0 to 5, and a sum of m and n is 1 or greater.

10. The modified polymer according to claim 8, wherein the modifier is at least one type of a nitrone compound selected from the group consisting of N-phenyl-α-(4-carboxyphenyl)nitrone, N-phenyl-α-(3-carboxyphenyl)nitrone, N-phenyl-α-(2-carboxyphenyl)nitrone, N-(4-carboxyphenyl)-α-phenylnitrone, N-(3-carboxyphenyl)-α-phenylnitrone, and N-(2-carboxyphenyl)-α-phenylnitrone.

11. The modified polymer according to claim 8, wherein the conjugated diene polymer is at least one type selected from the group consisting of butadiene rubber, styrene-butadiene rubber, and nitrile rubber.

12. The modified polymer according to claim 8, wherein an amount of the modifier is from 0.01 to 2.0 mol % of double bonds of the conjugated diene polymer.

13. The modified polymer according to claim 8, wherein an amount of the modifier is more than 1 mass % with respect to the conjugated diene polymer.

14. The rubber composition according to claim 2, wherein the modifier is at least one type of a nitrone compound selected from the group consisting of N-phenyl-α-(4-carboxyphenyl)nitrone, N-phenyl-α-(3-carboxyphenyl)nitrone, N-phenyl-α-(2-carboxyphenyl)nitrone, N-(4-carboxyphenyl)-α-phenylnitrone, N-(3-carboxyphenyl)-α-phenylnitrone, and N-(2-carboxyphenyl)-α-phenylnitrone.

15. The rubber composition according to claim 2, wherein the conjugated diene polymer is at least one type selected from the group consisting of butadiene rubber, styrene-butadiene rubber, and nitrile rubber.

16. The rubber composition according to claim 2, wherein an amount of the modifier is from 0.01 to 2.0 mol % of double bonds of the conjugated diene polymer.

17. The rubber composition according to claim 2, wherein an amount of the modifier is more than 1 mass % with respect to the conjugated diene polymer.

18. A tire comprising the rubber composition described in claim 2.

19. The modified polymer according to claim 9, wherein the modifier is at least one type of a nitrone compound selected from the group consisting of N-phenyl-α-(4-carboxyphenyl)nitrone, N-phenyl-α-(3-carboxyphenyl)nitrone, N-phenyl-α-(2-carboxyphenyl)nitrone, N-(4-carboxyphenyl)-α-phenylnitrone, N-(3-carboxyphenyl)-α-phenylnitrone, and N-(2-carboxyphenyl)-α-phenylnitrone.

20. The modified polymer according to claim 9, wherein the conjugated diene polymer is at least one type selected from the group consisting of butadiene rubber, styrene-butadiene rubber, and nitrile rubber.

* * * * *